United States Patent
Sousa

(10) Patent No.: US 10,728,013 B2
(45) Date of Patent: Jul. 28, 2020

(54) HALF-DUPLEX COMMUNICATION SYSTEM

(71) Applicant: Whelen Engineering Company, Inc., Chester, CT (US)

(72) Inventor: David J. Sousa, Ivoryton, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 165 days.

(21) Appl. No.: 15/995,514

(22) Filed: Jun. 1, 2018

(65) Prior Publication Data

US 2019/0372745 A1 Dec. 5, 2019

(51) Int. Cl.
| | |
|---|---|
| *H04B 1/38* | (2015.01) |
| *H04L 5/16* | (2006.01) |
| *H04B 1/401* | (2015.01) |
| *H04L 25/02* | (2006.01) |

(52) U.S. Cl.
CPC .............. *H04L 5/16* (2013.01); *H04B 1/401* (2013.01); *H04L 25/0264* (2013.01)

(58) Field of Classification Search
CPC ......... H04L 5/16; H04B 1/401; H04B 1/3822; H04B 1/40; B60Q 11/005; B60T 17/221
See application file for complete search history.

(56) References Cited

U.S. PATENT DOCUMENTS

| | | | |
|---|---|---|---|
| 6,317,052 B1 | 11/2001 | Welling et al. | |
| 6,906,817 B1 | 6/2005 | Berard et al. | |
| RE38,795 E | 9/2005 | Welling et al. | |
| 7,304,567 B2 | 12/2007 | Canfield | |
| 7,504,863 B2 | 3/2009 | Kim | |
| 7,970,374 B2 | 6/2011 | Riveiro et al. | |
| 8,525,660 B2 | 9/2013 | Miller et al. | |
| 2006/0061329 A1 | 3/2006 | Dawson | |
| 2006/0187015 A1 | 8/2006 | Canfield | |
| 2009/0092318 A1 | 4/2009 | Berard et al. | |
| 2009/0092320 A1 | 4/2009 | Berard et al. | |
| 2010/0102946 A1* | 4/2010 | Polak ..................... | B60Q 1/444 340/467 |
| 2018/0009377 A1* | 1/2018 | Troutman .............. | H05B 37/03 |

FOREIGN PATENT DOCUMENTS

EP          1933467 A2     6/2008

OTHER PUBLICATIONS

Cypress Semiconductor Corporation, San Jose, CA, "Powerline Communication Solution" CY8CPLC10 Data Sheet, Revised Nov. 10, 2008.
Hushley Jeff, "Using CY8CPLC20 in Powerline Communication (PLC) Applications", Cypress Semiconductor Corporation, San Jose, CA, Document No. 001-54416 Rev. B, Dec. 16, 2009.
PCT International Search Report and Written Opinion dated Aug. 19, 2019 (PCT Appl. PCT/US2019/033457).

* cited by examiner

*Primary Examiner* — Tuan Pham
(74) *Attorney, Agent, or Firm* — Alix, Yale & Ristas, LLP

(57) ABSTRACT

A half-duplex communication system includes a first half-duplex transceiver. The first half-duplex transceiver includes a first microprocessor and a current sensor connected to an input of the microprocessor, and the half-duplex transceiver is coupled to a first and second voltage source. The first voltage source is at a first voltage level and the second voltage source is at a second voltage level. The first microprocessor is configured to transmit data by alternatively connecting the first voltage source and the second voltage source to a conductor and to receive data in the form of pulses of current on the conductor detected by said current sensor.

20 Claims, 3 Drawing Sheets ively connecting the first voltage source and the second voltage source to a conductor and to receive data in the form of pulses of current on the conductor detected by said current sensor.

A conductor is coupled to the first half-duplex transceiver and at least one second half-duplex transceiver. The at least one second half-duplex transceiver includes a second microprocessor and a voltage sensor. The second half-duplex transceiver is operatively coupled to a load connected to the conductor, and the voltage sensor is arranged to detect voltage applied to the conductor. The second microprocessor is programmed to receive data in the form of pulses of the first and second voltages applied to the conductor and to transmit data in the form of pulses of current applied to the conductor by activating and deactivating the load.

The second microprocessor enters a sleep mode in response to the application of a first voltage on the conductor for a predetermined time period and enters a communication mode in response to the application of a second voltage on the conductor for a predetermined time period. During sleep mode, the second microprocessor deactivates the load, and during communication mode the second microprocessor alternates between activating and deactivating the load. The first microprocessor decodes the activating and deactivating of the load by monitoring the current sensor inputs to the first microprocessor. The first microprocessor includes an inoperative mode wherein the first microprocessor disconnects the first voltage source and the second voltage source from the conductor.

HALF-DUPLEX COMMUNICATION SYSTEM

FIELD OF THE DISCLOSURE

The present disclosure relates to half duplex communication systems for use across a conductor not dedicated to communications. A communication mode is established and voltage or current is modulated to exchange data on the conductor, with data transmitted in one direction at a time. Voltage modulation may be used in one direction, while current modulation may be used in the opposite direction.

BACKGROUND

Half-duplex communication systems over connected data lines enable data communication between two or more communication modules. A half-duplex communication system is typically composed of two or more half-duplex transceivers connected by at least one wired communication line. Conventional half-duplex communication systems typically include a dedicated communication line between the transceivers.

Connected systems, such as warning and signal equipment for emergency vehicles are increasingly sophisticated and there is a need to communicate with the equipment after installation. It is possible to update firmware, alter selected warning signals, and obtain information about the installed equipment and its operational status if a suitable communication path is available. One example of a type of data that can be transmitted from a piece of warning signal equipment is the operational status of the equipment. Other data which could be transmitted could be model number, serial number, warranty date, or other such desirable information. To be useful, signal equipment and operational status information must be accessible by a system external to the warning and signal equipment and ideally external to the vehicle. Material, manufacturing and installation cost can make it impractical to add a separate communication conductor to the emergency warning equipment installed at various locations around an emergency vehicle.

Some systems employ wireless (blue tooth, WiFi) communications systems to open a communications channel with warning signal equipment, but the hardware necessary for wireless communication can be expensive. It can be hard to justify the cost of wireless communication software when the communications channel is seldom used. According to the present disclosure, communication with warning signal equipment may be used during installation and during periodic service of the vehicle.

There is a need for a cost-effective two way communication system that will allow for information to be exchanged with warning signal equipment installed on an emergency vehicle using existing infrastructure of the warning signal system without the need for additional dedicated communication lines.

SUMMARY OF THE INVENTION

A half-duplex communication system includes a first half-duplex transceiver. The first half-duplex transceiver includes a first microprocessor and a current sensor connected to an input of the microprocessor, and the half-duplex transceiver is coupled to a first and second voltage source. The first voltage source is at a first voltage level and the second voltage source is at a second voltage level. The first microprocessor is configured to transmit data by alternatively connecting the first voltage source and the second

BRIEF DESCRIPTION OF THE DRAWINGS

These and other objects, features and advantages of the disclosed half-duplex communication system will become readily apparent to those skilled in the art upon reading the description of the exemplary embodiments, in conjunction with the attached drawings, in which.

DETAILED DESCRIPTION

Figure 1:
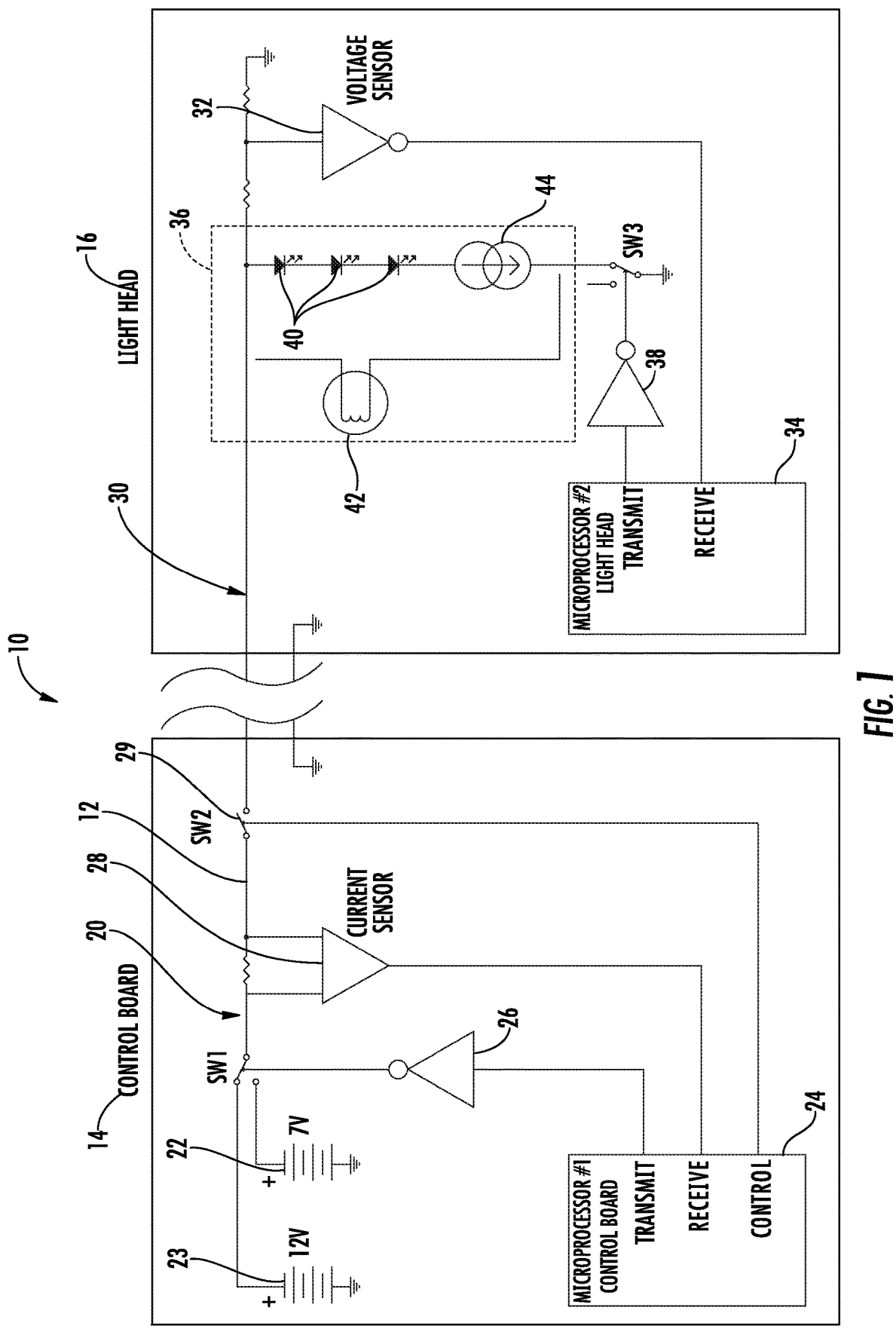
FIG. 1 is an electrical schematic of a half-duplex communication system exemplary of several aspects of the disclosure.

With reference to FIG. 1, wherein like numerals represent similar parts throughout the drawings. A first embodiment of a half-duplex communication system is generally designated by the reference numeral 10.

Warning signal equipment installed on an emergency vehicle includes at least one conductor to connect the equipment to a power source, such as vehicle power and a connection to the vehicle ground to complete the power circuit. The power conductor may be connected to a control console in the vehicle, to allow selective application of power to parts of the installed warning equipment as desired by the vehicle operator. The warning signal equipment includes a microcontroller with memory for storing operating instructions. Upon application of power, the microcontroller initializes and begins executing a program of operating instructions to generate a warning signal. The warning signal may be audible or visual. The power conductor may be routed back to a control console in the cab or passenger compartment of the emergency vehicle. The control console is configured to apply vehicle power to selected warning signal equipment as desired by a vehicle operator. The vehicle operator typically presses a button or moves a switch to activate a pattern of warning signals appropriate for a given emergency situation. For example, during a traffic stop, rear facing warning lights and forward facing illumination lights may be activated. The relevant warning signal equipment is connected so that activation of a switch on the control console connects each of the necessary components to vehicle power.

For various reasons, it may be difficult to include additional wires to each piece of warning signal equipment installed on an emergency vehicle. The disclosed half-duplex communication systems use an existing power conductor to establish two-way, half duplex communication between warning signal equipment and a system external to the equipment. It is preferred that the external system also be external to the emergency vehicle, which will allow equipment installers and fleet service personnel to set up, program, update and maintain the equipment without the need for an additional conductor or access to the equipment. The disclosure contemplates a single wired or wireless connection on the control console that will allow communication with warning signal equipment installed around the vehicle. Service personnel can connect a laptop to the wired or wireless connection on the control console and through this connection establish two way communication with various units of warning signal equipment on the vehicle.

One embodiment of the disclosed half-duplex communication system 10 uses a power conductor 12 that connects a unit of warning signal equipment such as a lighthead 16 to vehicle power. A control board 14 may be situated in a multifunction signal device such as a light bar, or may be situated in a control console. The control board 14 includes a simple half-duplex transceiver which utilizes an inexpensive microprocessor 24 to operate a switch to transmit information on the conductor 12. The lighthead 16 includes a microprocessor 34 configured as a half-duplex transceiver 30 that is configured to receive and respond to requests and information from the control board transceiver 20. In an exemplary embodiment, control board 14 is connected to power conductor 12 external to the housing of light head 16, for example in the control console or at a lightbar control board. These locations typically already include connections to the power conductors of multiple warning signal units (such as lights and/or sirens) and are therefore ideal locations for the "command" side of the disclosed half-duplex communication system 10.

While the microprocessors 24, 34 are shown as separate components, their functionality may be incorporated into existing microcontrollers on the control board 14 or in a control head (not shown). In this embodiment, the microcontroller includes program instructions for entering a communication mode, initializing communication with a warning signal unit, sending and receiving information from the warning signal unit, and returning the warning signal unit to normal operating mode. The transceiver functionality can be obtained in this way without the addition of a separate microprocessor or microcontroller. This version of the concept requires sufficient processing power, memory and the availability of suitable inputs and outputs on the microcontroller for the respective control board 14 and warning signal device 16.

The disclosed embodiment assumes that the control board 14 and lighthead 16 have primary microcontrollers (not shown) that manage all the normal functions of the control board 14 and lighthead 16. The microprocessors 24, 34 are relatively simple, low cost devices with limited processing power and are dedicated to the disclosed half duplex communication function only. As such, the microprocessors 24, 34 are active only when communication between the control board 14 and the lighthead 16 is desired.

As shown in FIG. 1, the control board 14 includes the components of the first half-duplex transceiver 20, which may be referred to as the "command" transceiver because the communication mode will be initiated and terminated from this transceiver 20. In a normal operating mode, vehicle power 23 (roughly 12 VDC) is applied to the lighthead 16, which initializes the primary microcontroller (not shown) and executes the main operating routine to generate a designated warning signal pattern. In the normal operating mode, lighthead microprocessor 34 does not see the alternate voltage 22 and remains in a "sleep" or inactive mode. The control board 14 is equipped with at least one additional voltage source 22 in addition to vehicle power 23. In one embodiment, application of a voltage 22 different than vehicle voltage 23 can be used to initiate a communication mode in the lighthead 16. Upon detection of voltage 22, the lighthead microcontroller 34 is configured to enter a communication mode, or "wake up" from a sleep mode. The alternate voltage 22 is disclosed as 7 VDC, but is not limited to this specific voltage. One aspect of the alternate voltage 22 is that it should be sufficiently different than the vehicle voltage 23 that it is easy to distinguish from vehicle voltage 23, which can vary from about 10 VDC to about 14 VDC. Choosing an alternate voltage 22 less than vehicle voltage 23 also allows use of a low-cost regulated voltage integrated circuit, rather than a circuit that needs to convert vehicle power into a higher voltage.

In an exemplary embodiment, representative first voltage source 23 is 12 VDC, corresponding to a vehicle voltage, which commonly varies between approximately 14 VDC to 10 VDC. First voltage source 23 can be 24 VDC, 48 VDC or other such preselected voltage level as desired in a particular application in other exemplary embodiments. In an exemplary embodiment, the second (alternate) voltage source 22 is a 7 VDC integrated circuit, but can be in the range of 3 volts to 8 volts. Depending on the voltage level selected for first voltage source 23 (e.g. 24 VDC, 48 VDC, etc.), second voltage source 22 is selected to be a lower relative reference voltage from first voltage source 23 (e.g. a 15 VDC second voltage source 22 for a 24 VDC first voltage source 23 application as a non-limiting example). The first microprocessor 24 controls a first switch SW1 that applies either the first voltage 23 or the second voltage 22 to a power conductor connected to the lighthead 16. The first microprocessor 24 also controls a second switch SW2 which applies or removes power from the conductor 12. To operate the lighthead 16 in a normal mode, SW1 applies the first voltage 12 VDC to the conductor 12, and SW2 is closed, applying 12 VDC to the lighthead 16. A voltage detector 32 in the lighthead detects 12 VDC and starts the lighthead 16 in normal mode, running the firmware in its microcontroller 39 to intermittently provide a path for electric current through the LEDs 40 to generate a warning light signal saved in memory.

To place the lighthead 16 in communication mode, the control board microcontroller 24 actuates switch SW1 to place the second (alternate) voltage 22 on conductor 12 and closes switch SW2, applying the alternate voltage 22 to the lighthead 16. Lighthead 16 sees 7 VDC at the voltage detector 32, the lighthead microcontroller 34 enters a communication mode and monitors the receive input connected to the voltage detector 32. The control board microprocessor 24 toggles switch SW1 to place alternating pulses of vehicle voltage 23 and alternate voltage 22 on conductor 12, which are received through the voltage detector 32 and receive input at the lighthead microcontroller 34. The voltage pulses represent serial communication of commands and data from the control board microprocessor 24 to the lighthead microprocessor 34. The lighthead microprocessor 34 is programmed to decode and respond to commands from the control board microprocessor 24.

The lighthead 16 includes a series connected string of three LEDs 40 and a current regulator (constant current sink) 44 connected to an output 38 of the lighthead microprocessor 34. In a normal mode of operation, the lighthead microprocessor 34 actuates switch SW3 according to program instructions stored in memory to apply power to the LEDs 40 to generate a warning light signal. Power for the LEDs 40 flows from voltage source 23, through current sensor 28, the LEDs 40 and the current regulator 44 to ground, with each period of power applied to the LEDs 40 generating a corresponding pulse of current at the current sensor 28. In the communication mode, the lighthead microprocessor 34 toggles SW3 to intermittently connect the current regulator 44 to ground which causes current to flow through the LEDs and generates a corresponding pulse of current at the current detector 28. The pattern of current pulses at the current detector 28 represent serial data from the lighthead microprocessor 34 in response to commands and data from the control board microprocessor 24. The control board microprocessor 24 is programmed to decode pulses of current at the current detector 28.

The light head 16 includes a second half-duplex transceiver 30 which includes a voltage sensor 32, a second microprocessor 34, a load 36, and a current driver 38. The voltage sensor 32 is configured to detect voltage applied to conductor 12 and transmit the voltage level information to the second microprocessor 34. In an exemplary embodiment, the lighthead microprocessor 34 has a default sleep mode and an communications mode. During the sleep mode, the lighthead microprocessor 34 maintains the load 36 in a deactivated state which disconnects the load 36 from ground by control of switch SW3. In the communications mode, the second microprocessor 34 triggers the current driver 38 to alternate between activating and deactivating the load 36 with switch SW3. In the depicted embodiment, the load 36 is a series of LEDs 40 or an incandescent halogen lightbulb 42 with a constant current sink 44, but other current sources could be substituted and do not depart from the scope of this disclosure.

The first microprocessor 24 controls the second microprocessor 34 by selecting which voltage source 22, 23 is connected to conductor 12. In one embodiment, when the first microprocessor 24 connects the high voltage source 23 to the conductor 12 the lighthead microprocessor 34 enters the sleep mode. During the lighthead microprocessor 34 sleep mode, normal operation of the load 36 to generate warning light signals can be achieved using other components (not shown) located within the light head 16. When the control board microprocessor 26 connects the alternate voltage source 23 to the conductor 12 the lighthead microprocessor 34 enters the communications mode. Once the lighthead microprocessor 34 has entered the communications mode, it will monitor the voltage sensor 32 to receive instructions from first microprocessor 24. First microprocessor 24 transmits data instructions to the second microprocessor 34 by toggling switch SW1 between the low voltage source 22 and high voltage source 23. The toggled voltage states are detected by second microprocessor 34 by voltage sensor 32, and data is decoded from these varied voltage states and durations. During a period after the control board microprocessor 24 has completed a data transmission, lighthead microprocessor 34 can then commence transmitting data from the light head 16 to the control board 14 over conductor 12. During the transmission of data from the lighthead microprocessor 34 to control board microprocessor 24, lighthead microprocessor 34 toggles switch SW3 between an open position and ground to alternatively cause power to be applied through load 36. The resulting changes in current through the conductor 12 are detected by the current sensor 28 which conveys this data to the control board microprocessor 24 receive input. The control board microprocessor 24 converts the current fluctuations into data. Examples of data received from a lighthead are: lighthead model number, operational status, color, selected warning signal pattern, or the like.

In the depicted embodiment, the first half-duplex transceiver 20 transmits data using changes in voltage and receives data using changes in current from the second half-duplex transceiver 30.

Figure 2:
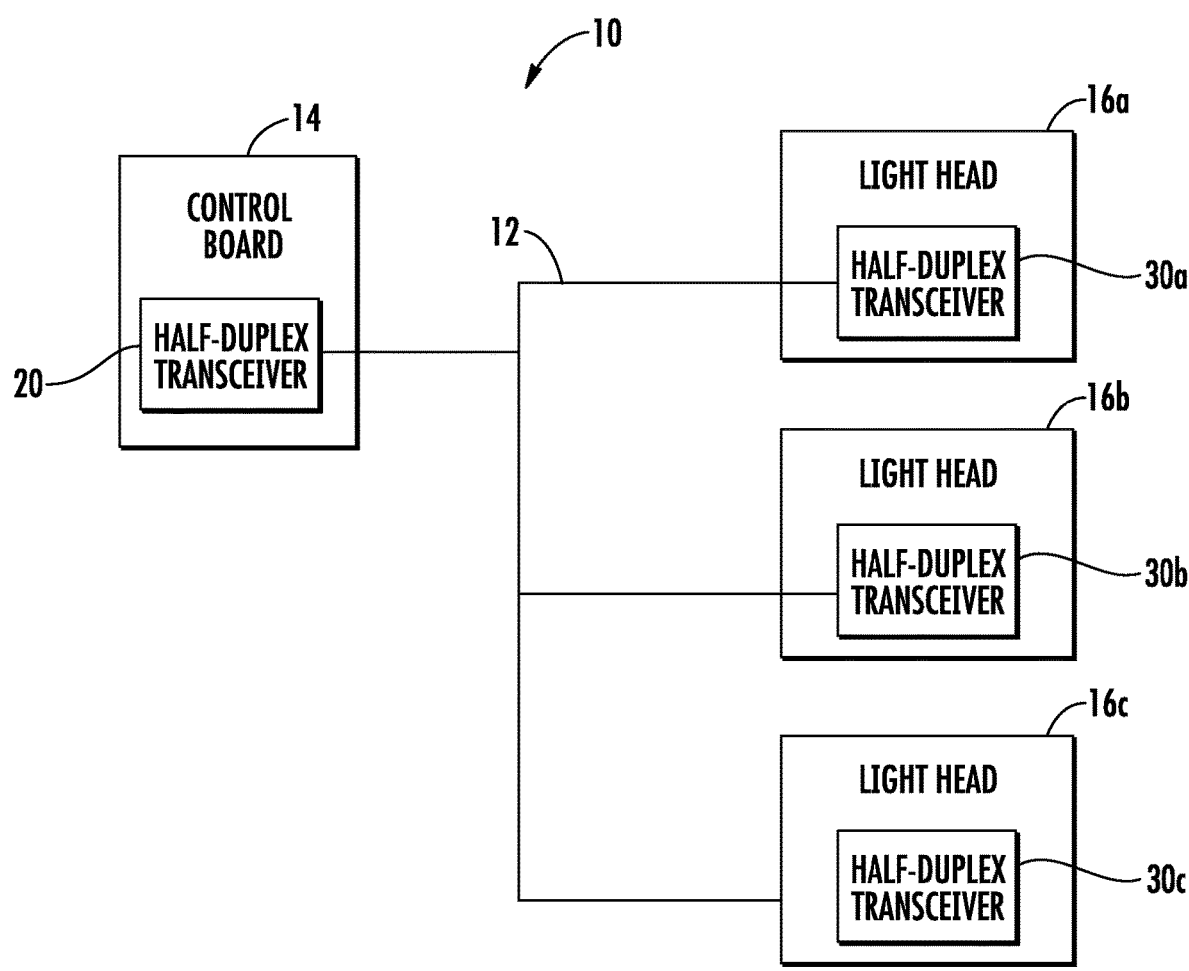
FIG. 2 is a block diagram of a half-duplex communication system showing an exemplary embodiment of a control board connected to multiple light heads with a common conductor.

Referring to FIG. 2, the first half-duplex transceiver 20 is connected to a plurality of second half-duplex transceivers 30a, 30b, 30c along a single conductor 12. The structure of the half-duplex communication system 10 allows it to be incorporated into transceivers without a dedicated communication conductor or costly wireless communication link. Each of the half-duplex transceivers 30a, 30b, 30c will be identified by a unique code, which will be included in queries or commands from the control board microprocessor 24. Microprocessors in each of the half duplex transceivers 30a, 30b, 30c are programmed to respond to queries or commands that include its unique code and to ignore queries or commands intended for other warning signal units connected to the common conductor 12.

Figure 3:
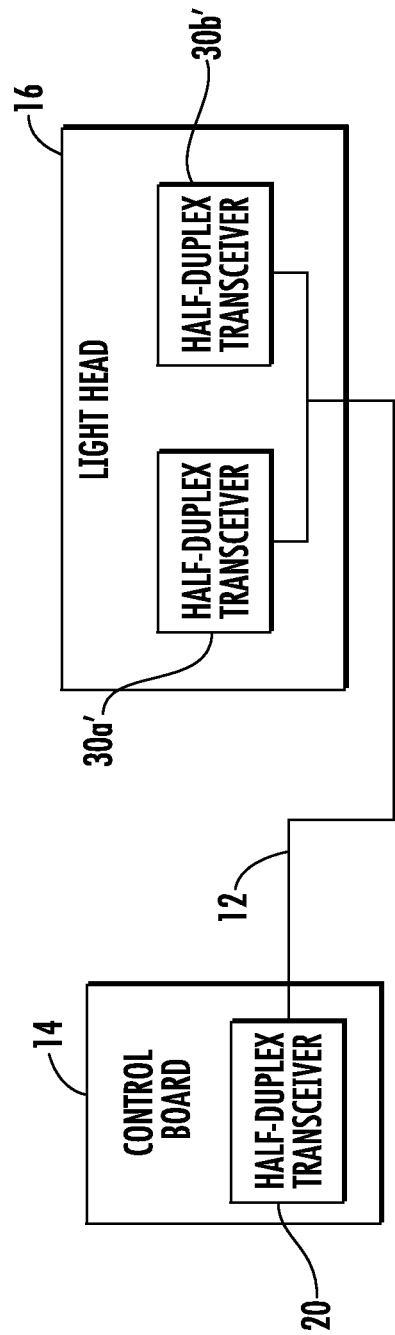
FIG. 3 is a block diagram of an alternative embodiment of a half-duplex communication system according to aspects of the disclosure.

Referring to FIG. 3, in another exemplary embodiment, first half-duplex transceiver 20 is connected to two second half-duplex transceivers 30a', 30b' which are both located within a single light head 16. It can be appreciated that a combination of series and parallel connections to one or more light heads 16 in view of FIGS. 2 and 3 can be obtained without departing from the scope of the disclosure.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

I claim:

1. A half-duplex communication system, comprising:
a half-duplex transceiver comprising a microprocessor and a current sensor connected to an input of the microprocessor, said half-duplex transceiver operatively coupled to a first and second voltage source, wherein the first voltage source is at a first voltage level and the second voltage source is at a second voltage level, and wherein said microprocessor is configured to transmit data by alternatively connecting said first voltage source and said second voltage source to a conductor and to receive data in the form of pulses of current on said conductor detected by said current sensor.

2. The half-duplex communication system of claim 1, further comprising:
a conductor coupled to the first half-duplex transceiver and at least one second half-duplex transceiver;

said at least one second half-duplex transceiver comprising a second microprocessor and a voltage sensor, said second half-duplex transceiver operatively coupled to a load connected to said conductor, said voltage sensor arranged to detect voltage applied to said conductor, said second microprocessor programmed to receive data in the form of pulses of said first and second voltages applied to said conductor and to transmit data in the form of pulses of current applied to said conductor by activating and deactivating said load.

3. The half-duplex communication system of claim 2, further comprising:

wherein said second microprocessor enters a sleep mode in response to the application of said first voltage on said conductor for a predetermined time period and enters a communication mode in response to the application of said second voltage on said conductor for a predetermined time period, during said sleep mode said second microprocessor deactivates said load, and during said communication mode said second microprocessor alternates between activating and deactivating said load and said first microprocessor decodes the activating and deactivating of said load by monitoring said current sensor inputs to said first microprocessor.

4. The half-duplex communication system of claim 2, further comprising an inoperative mode wherein said first microprocessor disconnects said first voltage source and said second voltage source from said conductor.

5. The half-duplex communication system of claim 1, wherein the first voltage source supplies voltage at a higher voltage level than the second voltage source.

6. The half-duplex communication system of claim 1, wherein the first voltage source supplies voltage at a lower voltage level than the second voltage source.

7. The half-duplex communication system of claim 2, wherein said load is a plurality of LEDs connected in series with the conductor.

8. The half-duplex communication system of claim 1, wherein the first voltage source is a 12 volt power source.

9. The half-duplex communication system of claim 1, wherein the first voltage source is greater than 10 volts and less than 55 volts.

10. The half-duplex communication system of claim 1, wherein the second voltage source is a 7 volt power source.

11. The half-duplex communication system of claim 1, wherein the second power supply is greater than 3 volts and less than 45 volts.

12. A system for implementing a half-duplex communication system, comprising:

a first half-duplex transceiver comprising a microprocessor and a current sensor connected to an input of the microprocessor, said half-duplex transceiver operatively coupled to a first and second voltage source, wherein the first voltage source is at a first voltage level and the second voltage source is at a second voltage level, and wherein said first microprocessor is configured to transmit data by alternatively connecting said first voltage source and said second voltage source to said conductor and to receive data in the form of pulses of current on said conductor detected by said current sensor;

a conductor coupled to the first half-duplex transceiver and a plurality of second half-duplex transceivers;

said plurality of second half-duplex transceivers each comprising a second microprocessor and a voltage sensor, each of said second half-duplex transceivers operatively coupled to a corresponding load connected to said conductor, said voltage sensor arranged to detect voltage applied to said conductor, said second microprocessor programmed to receive data in the form of pulses of said first and second voltages applied to said conductor and to transmit data in the form of pulses of current applied to said conductor by activating and deactivating said load.

13. The half-duplex communication system of claim 12, further comprising:

wherein said each of said second microprocessors enters a sleep mode in response to the application of said first voltage on said conductor for a predetermined time period and enters a operational mode in response to the application of said second voltage on said conductor for a predetermined time period, during said sleep mode said second microprocessor deactivates said load, and during said communication mode said second microprocessor alternates between activating and deactivating said load and said first microprocessor decodes the activating and deactivating of said load by monitoring said current sensor inputs to said first microprocessor.

14. The half-duplex communication system of claim 12, further comprising an inoperative mode wherein said first microprocessor disconnects said first voltage source and said second voltage source from said conductor.

15. The half-duplex communication system of claim 12, wherein the first voltage source supplies voltage at a higher voltage level than the second voltage source.

16. The half-duplex communication system of claim 12, wherein the first voltage source supplies voltage at a lower voltage level than the second voltage source.

17. The half-duplex communication system of claim 12, wherein said load is a plurality of LEDs connected in series with the conductor.

18. The half-duplex communication system of claim 12, wherein the first voltage source is a 12 volt power source.

19. The half-duplex communication system of claim 12, wherein the first voltage source is greater than 10 volts and less than 55 volts.

20. The half-duplex communication system of claim 12, wherein the second voltage source is a 7 volt power source.

* * * * *